May 31, 1938.  H. C. GRANT, JR  2,119,326
DETECTION OF SUSPENDED MATTER IN FLUIDS
Filed Sept. 6, 1933  3 Sheets-Sheet 1
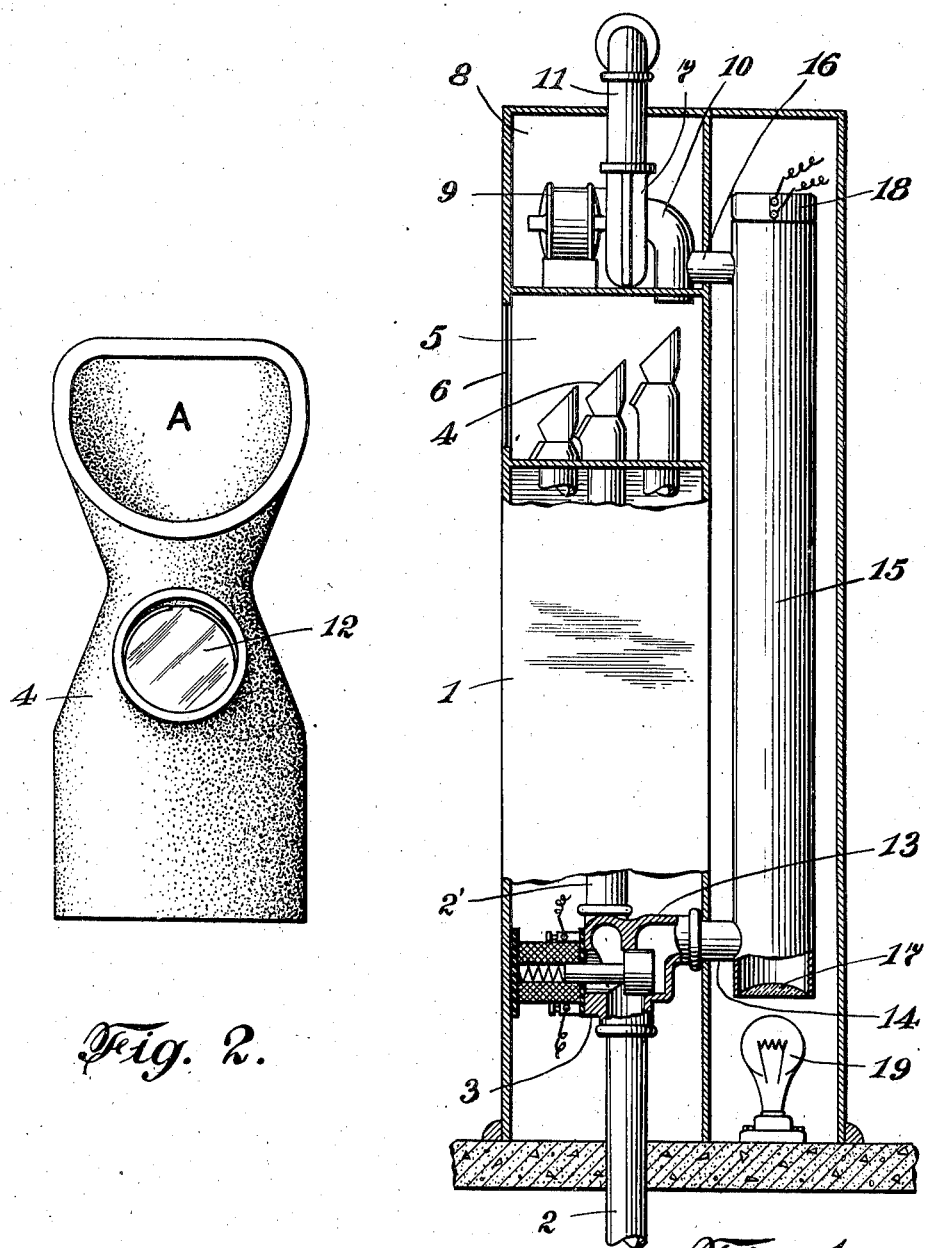
INVENTOR
*Harry Campbell Grant Jr.*
BY
*J. William Carson*
ATTORNEY May 31, 1938.    H. C. GRANT, JR    2,119,326
DETECTION OF SUSPENDED MATTER IN FLUIDS
Filed Sept. 6, 1933    3 Sheets-Sheet 3
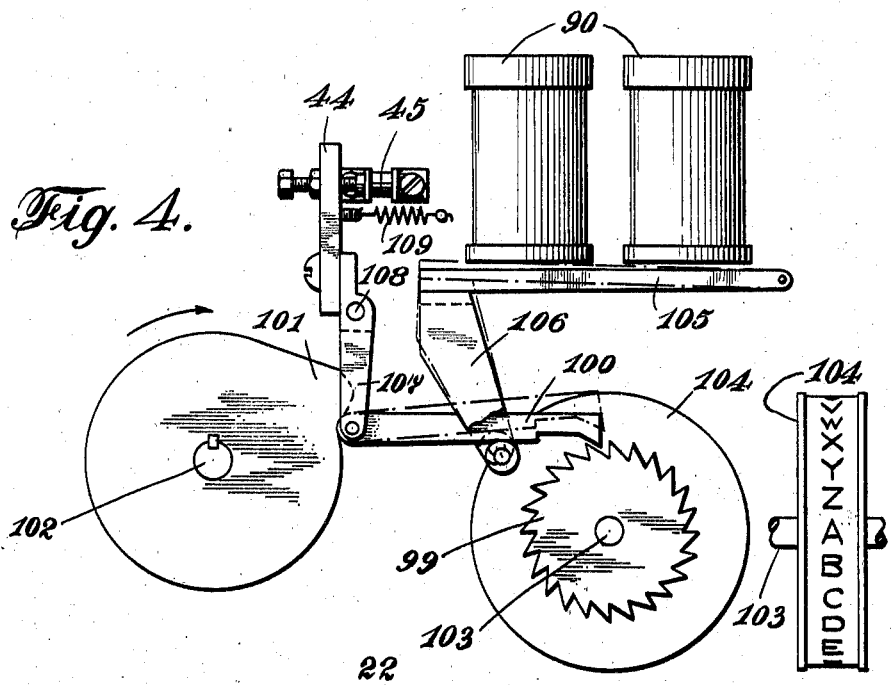
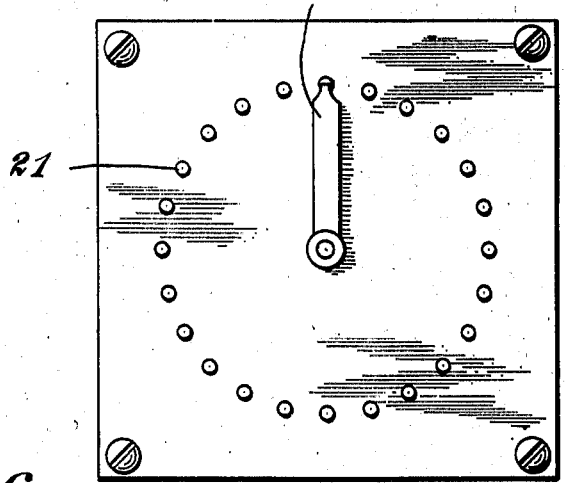
INVENTOR
Harry Campbell Grant Jr.
BY
ATTORNEY Patented May 31, 1938

2,119,326

UNITED STATES PATENT OFFICE 2,119,326

DETECTION OF SUSPENDED MATTER IN FLUIDS

Harry Campbell Grant, Jr., New York, N. Y., assignor to Walter Kidde & Company, Inc., Bloomfield, N. J., a corporation of New York Application September 6, 1933, Serial No. 688,324

3 Claims. (Cl. 177—311)

The present invention relates to apparatus for detecting the presence and origin of smoke or other suspended matter in fluids and embodies, more specifically, a combined visual inspection and automatic detecting apparatus, wherein both the visual and the automatic detecting means indicate the presence and origin of smoke or other suspended matter in fluid streams drawn from a plurality of compartments, and in which upon failure of the automatic detecting means, visual inspection of all of the plurality of compartments being supervised is restored.

In its preferred form of construction, the invention embodies a visual detecting apparatus of the type shown in Letters Patent of the United States No. 1,343,911, preferably modified in accordance with Letters Patent of the United States No. 1,516,608, in each of which is shown a plurality of fluid stream conductors leading from compartments to be supervised, and terminating in a common visual inspection chamber, combined with automatic detecting apparatus arranged to have the fluid streams from the fluid stream conductors diverted thereto in succession prior to their becoming diluted in the common visual inspection chamber, the arrangement also being such that upon failure of the automatic detecting apparatus at a time when a fluid stream conductor is connected thereto, visual inspection of such fluid stream is restored.

It is accordingly an object of the present invention to provide an apparatus for detecting the presence of suspended matter in fluids drawn from a plurality of compartments, combining both visual inspection and automatic detecting means so arranged that upon failure of the automatic detecting means, visual inspection of all of the plurality of compartments being supervised is restored.

It is another object of the invention to provide an apparatus of the type referred to in which failure of the automatic detecting means renders a trouble alarm, the removal of which results in the restitution of the visual inspection of all of the plurality of compartments being supervised.

It is another object of the invention to provide means for indicating the origin of the smoke or other suspended matter detected.

It is a further object of the invention to give a persisting indication of the presence of suspended matter in a particular fluid stream.

It is a still further object of the invention to provide an electrical system for accomplishing the above objects, the same being preferably arranged to eliminate the arcing of the electrical contacts of the fluid stream conductor switching means.

These, and other objects of the invention, not specifically enumerated above, will be apparent as the invention is described in greater detail in connection with the accompanying drawings, wherein:

Figure 1 shows more or less diagrammatically the principal constituent parts of a combined visual and automatic smoke detecting apparatus.

Figure 2 shows an enlarged view in front elevation of one of the smoke analyzers shown in the common visual chamber of Figure 1.

Figure 4 is a view in elevation of the principal parts of the fluid stream conductor switch controlling means and its timing device, together with the means for indicating the origin of the fluid streams being supervised.

Figure 5 is a further view of the indicating means of Figure 4, being taken at right angles thereto.

Figure 6 is a view in elevation of the switching means controlled by the apparatus of Figure 4.

Figure 3:
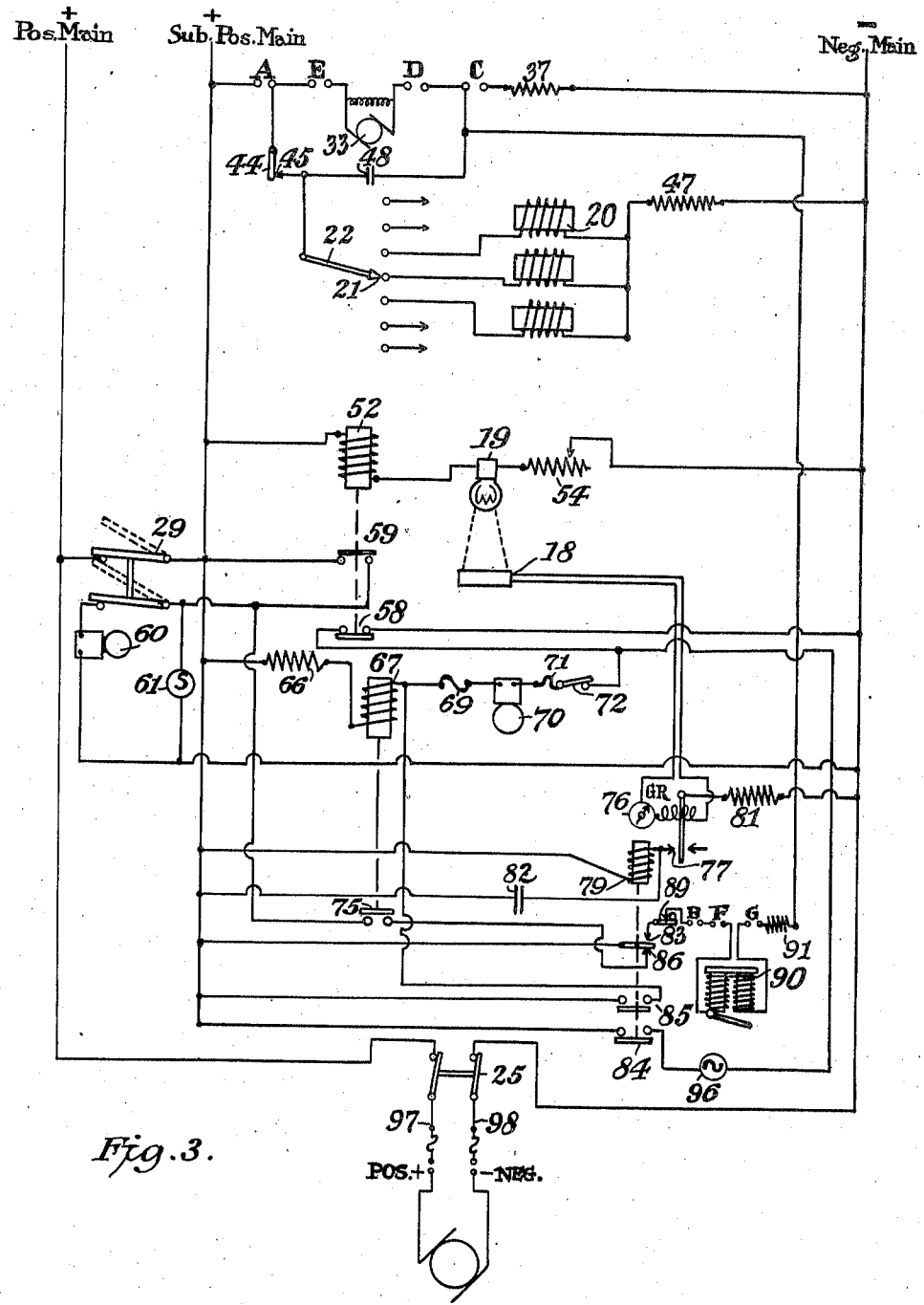
Figure 3 is a conventional view showing the electrical circuits and connections of the electrical system of the present invention.

Referring to Figure 1, the reference numeral 1 represents a cabinet for housing both the visual inspection and automatic detecting means. A fluid stream conductor 2 leads from each compartment to be supervised, through an electrically controlled three-way valve 3, through a continuation 2' of the fluid stream conductor 2, a plurality of the fluid stream conductors being shown terminating in smoke analyzers 4 arranged within the visual inspection chamber 5, the smoke analyzers being disclosed through the glass front 6 of the cabinet 1. The smoke analyzers 4 are arranged in banks as shown, so as to be more readily seen. A rotary blower 7 is mounted in the chamber 8 of the cabinet, and is operated by an electric motor 9. A pipe 10 connects the interior of the chamber 5 with the suction of the blower 7, and the exhaust pipe 11 from the blower may be led to any suitable and convenient point. It will, therefore, be seen that operation of the blower 7 will draw air through the several fluid stream conductors from all the compartments being supervised.

The arrangement, as above described, is substantially in accordance with the United States Patent No. 1,343,911, in which connection it will be noted that visual indication of the presence of smoke in a particular fluid stream conductor is given by the escape of smoke from the orifice of the corresponding smoke analyzer into the visual inspection chamber 5, which is observable through the glass front 6.

However, as already pointed out, it is preferable to introduce into the above described arrangement the improved modification in accordance with the United States Patent No. 1,516,608, in accordance with which normally invisible beams of light are projected up through the orifices of the smoke analyzers into the visual inspection chamber 5, so that the presence of smoke in any fluid stream issuing from the orifice of a smoke analyzer will cause the beam of light projected through said orifice to become delineated by the reflection and refraction of light from the particles of smoke, thus serving to give a more pronounced indication of the smoke analyzer from which the particular fluid stream is issuing. It is hardly believed necessary to illustrate the modification herein referred to, as reference to the same is being made simply for the purpose of indicating the scope of the present invention.

In order to even more accurately determine the smoke analyzer through which smoke is being discharged, the smoke analyzers are preferably constructed as shown in Figure 2, having a sight opening 12 in the front wall thereof closed by a suitable transparent window, the latter permitting observation of the normally invisible beams of light when they are illuminated by the presence of smoke, before the fluid stream carrying smoke has entered into and become diluted in the common visual inspection chamber 5.

Referring again to Figure 1, the electrically operated three-way valve 3 is shown in the position to permit a fluid flow straight through the visual inspection apparatus. However, the valve 3 is shown with a side outlet 13 connecting by means of an inlet pipe 14 with the elongated detecting chamber 15 of the automatic detecting apparatus, the detecting chamber 15 being connected near the opposite end, through a branch pipe 16, to the pipe 10 leading to the blower 7. When, therefore, a valve 3 has been actuated so as to cut off communication between a fluid stream conductor 2 and its continuation 2' and to establish communication between the fluid stream conductor 2 and the detecting chamber 15, the blower 7 will cause the fluid stream from the particular fluid stream conductor to be drawn through the detecting chamber 15, the blower 7 at the same time causing all of the remaining fluid streams to be drawn through the visual inspection chamber. At one end of the detecting chamber 15 is shown an optical lens 17, and at the other end is shown a light-sensitive element 18 with the necessary leads for connecting it into an electrical circuit. A source of light 19 is provided for directing a beam of light through the lens 17 and the detecting chamber 15 upon the light-sensitive element 18, so that the introduction of smoke or other suspended matter into the detecting chamber 15 will cause such a decrease in the intensity of the light impinging upon the light-sensitive element 18 as can be converted into a suitable alarm signal.

It will, of course, be understood that the particular arrangement of optical elements shown for the purpose of automatically detecting the presence of suspended matter, has been given by way of example only, and that other suitable arrangements of automatic suspended matter detecting apparatus can be substituted for the form shown.

Referring now to Figure 3, in which the reference numerals 18 and 19 are respectively the light-sensitive element and source of light previously referred to, the reference numeral 20 represents an electro-magnet for operating one of the three-way valves 3 shown in Figure 1, each of the valves 3 being provided with its own electro-magnet 20. The various electro-magnets 20 are arranged to be operated in succession through contacts 21 and switch arm 22, in the manner about to be described, so that the valves 3 are operated in succession to connect one fluid stream conductor 2 at a time to the automatic detecting apparatus, all of the other fluid stream conductors continuing at the same time to be connected to the visual detecting apparatus.

In Figure 3, current flows from the positive terminal POS. through one side of the automatic detecting apparatus cut-off switch 25 to the Pos. Main, then through one side of the buzzer switch 29 to the Sub. Pos. Main, through terminals A and E, through the armature and field of the timer motor 33, through terminals D and C, through resistance 37 to the Neg. Main, and then through the other side of the automatic detecting apparatus cut-off switch 25, to the negative terminal NEG., causing operation of the timer motor 33. Current also flows from the terminal A (which is positive in the manner just described), through the motor driven breaker 44 and its contact 45, through the switch arm 22 of the selector device, through the contact 21, through one valve electro-magnet 20, and through resistance 47 to the Neg. Main, causing operation of the particular valve electro-magnet 20. In order to prevent the burning away of the contacts 21 of the selector switch device due to the arc caused by the inductance of the valve electro-magnets 20 when transfer is made from one switch point to the next, the motor driven breaker 44 is mechanically arranged to open its circuit before the selector switch arm 22 moves and to close after the selector switch arm has reached a new point. Consequently, no electrical circuit is broken at the selector switch points 21. The condenser 48 shown near the motor driven breaker 44 is connected across each valve electro-magnet 20 in turn in series with resistance 47, through the terminal C and resistance 37, in order to reduce the arcing of the contacts 45 of the motor driven breaker 44 when it opens its circuit. The resistance 47 is used to reduce the current through the valve electro-magnets 20 to the proper amount.

Current also flows from the Sub. Pos. Main through relay 52, through the main lamp 19, and through the meter control resistance 54 to the Neg. Main, causing the operation of relay 52 and the main lamp 19. The meter control resistance 54 is provided to permit the manual adjustment of the voltage across the main lamp to increase the light output thereof as the optical system becomes dirtier with increasing time and as the light output decreases due to the aging of this lamp, this control requiring infrequent adjustment. Failure of the main lamp 19 permits the release of relay 52, opening the contact 58, and closing the contact 59. Opening of contact 58 prevents operation of the main automatic detecting apparatus alarm signals by breaking a circuit yet to be described. Closing of contact 59 causes operation of the trouble buzzer 60 and the trouble lamp 61 by reason of connection from the Sub. Pos. Main through contact 59, and through the trouble buzzer 60 and the trouble lamp 61 in parallel to the Neg. Main. These signals are common trouble signals, but in the present instance indicate the failure of the main lamp 19.

Current also flows from the Sub. Pos. Main, through resistance 66, through relay 67, through the main gong fuse 69, through the main gong 70, returning through the other main gong fuse 71, the normally closed gong switch 72, and through contact 58 of relay 52, to the Neg. Main, causing operation of relay 67. Failure of the main gong circuit permits the release of relay 67, causing the operation of the trouble signals through contact 75, of relay 67.

In Figure 3, the light-sensitive element 18 is shown as a photo-electric cell of the photo-voltaic type, being connected in a closed series circuit with the meter 76 and the coil of the galvanometer relay G. R. When the proper light intensity is directed upon the light-sensitive element 18, the contact 77 of the galvanometer relay is held open. Introduction of smoke, reducing the light intensity on the light-sensitive element, permits this contact to close, causing a current to flow from the Sub. Pos. Main through relay 79, through the contact 77 of the galvanometer relay, and through resistance 81, to the Neg. Main, causing the operation of relay 79. Resistance 81 is used to reduce the current to the proper operating value of relay 79. The condenser 82 is connected across the relay 79 to eliminate arcing of the galvanometer relay contacts. The one side of the condenser 82 connects directly with relay 79. The other side of the condenser 82 connects directly with the Sub. Pos. Main. The other terminal of relay 79 will also be found to connect directly with the Sub. Pos. Main. Operation of relay 79 closes the contacts 83, 84 and 85, and opens the contact 86. Closing of the contact 83 causes current to flow from the Sub. Pos. Main through contact 83, through the line re-check button 89, through terminal B, through terminal F, through the pawl lifter magnets 90, through terminal G, through resistance 91, through terminal C, and through resistance 37, to the Neg. Main. Operation of the pawl lifter magnets 90 permits the selector switch arm 22 to remain on the point on which it happened to be until relay 79 releases or until the circuit through the pawl lifter magnets is broken by operation of the line re-check button 89. A further description of the manner in which the pawl lifter magnets operate will be given hereinafter.

Closing of contact 85 of relay 79 causes current to flow from the Sub. Pos. Main through contact 85, through the main gong 70, returning through the normally closed gong switch 72 and contact 58 of relay 52, and to the Neg. Main. Closing of contact 84 of relay 79 causes current to flow from the Sub. Pos. Main through contact 84, through the smoke lamp 96, returning through contact 58 of relay 52, to the Neg. Main. Operation of contacts 84 and 85, therefore, causes operation of the smoke lamp 96 and the main smoke gong 70. Opening the gong switch 72 cuts the circuit to the main smoke gong 70, but leaves the circuit through the smoke lamp 96 intact.

Similarly, operation of the buzzer switch 29 breaks the circuit to the trouble buzzer 60, but leaves the circuit to the trouble lamp 61 intact through a circuit established by the crossing over of the buzzer switch 29 from the positive terminal through the trouble lamp 61. The buzzer switch also breaks the circuit of the line from the positive terminal POS. to the timer motor 33, the valve electro-magnets 20, the main lamp 19, and the main smoke gong 70.

While the circuits and connections for the various elements of the visual detecting apparatus illustrated in Figure 1 have not been shown, it should be noted that the positive and negative connections for the visual detecting apparatus are obtained from the terminal wires 97 and 98.

It will therefore be seen that operation of the buzzer switch 29 disconnects the entire automatic detecting apparatus, leaving the visual detecting apparatus operating and the trouble lamp 61 lighted. If the derangement is such that it is considered desirable to leave the automatic detecting apparatus out of operation for a time, the automatic detecting apparatus cut-off switch 25 may be opened, thereby breaking both the negative and positive lines to the automatic detecting apparatus, permitting the re-closing of the buzzer switch 29 and causing the trouble lamp 61 to go out.

It will be noted that the lower side of relay 67 is normally positive through resistance 66. Operation of relay 79, indicating a smoke alarm condition, causes the upper side of relay 67 to become positive through the closing of contact 85 of relay 79, thus short-circuiting the relay 67 and the resistance 66, and permitting operation of the smoke gong 70 in the manner already described. Since, in this case, the relay 67 is short-circuited, closing of the contact 75 of the relay 67 would cause the trouble signals to operate at the same time as the smoke alarm signals. In order to prevent this, operation of the relay 79 also opens contact 86 thereof to break the positive feed to the trouble signals through the contact 75.

It has already been pointed out that failure of the main lamp 19 results in opening of the contact 58 of the relay 52. It has also been shown how the smoke lamp 96 and main smoke gong 70 are energized through this contact, when it is closed. It will therefore be seen that failure of the main lamp 19 cannot institute false smoke signals, since the energizing circuit of the smoke signals is broken upon failure of the main lamp.

Referring now to Figure 4, the timer arrangement for the operation of the valve electro-magnets 20 consists of a selector switch (having the switch points 21 and switch arm 22, as described in connection with Figure 3 and as shown separately in Figure 6) which is driven step by step by a ratchet 99 and a pawl 100 operated from a cam 101 on the shaft 102 of a continuously running motor, which has already been described as the timer motor 33. The shaft 103 carrying the selector switch also carries an indicating drum 104 on the periphery of which reference characters are marked for visually indicating which of the valves 3 is connected to the automatic detecting apparatus. It will, of course, be apparent that the indicating drum can be mounted within the cabinet 1 (see Figure 1) so as to be viewable through a suitable observation window.

As already described in connection with Figure 3, the presence of smoke in a fluid stream results in the operation of the relay 79, the closing of the contact 83 of which energizes the pawl lifter magnets 90, which lift the pawl 100 from the ratchet 99 through the medium of the pawl lifter magnets armature 105 and the yoke 106, permitting the switch arm 22 of the selector switch to remain on the point 21 controlling the electro-magnet 20 of the particular valve 3 which has permitted smoke to pass to the automatic detecting apparatus. The timer motor 33, however, continues to operate. When attention has been attracted by the smoke signals and the indicating reference character of the fluid stream conductor has been noted from the indicating drum 104, the pawl 100 may be released to re-engage with the ratchet 99 by operation of the line re-check button 89 which breaks the circuit to the pawl lifter magnets 90. This button must be held depressed until it is noted that the indicating drum 104 has shifted at least one step.

Still referring to Figure 4, it will be noted that the breaker 44 with the contact 45 controlled by it, as described in connection with Figure 3, is also operated by the cam 101 on the shaft of the timer motor, the breaker 44 being mounted on the arm 107, which is pivoted at 108 and which serves also to operate the pawl 100. With this arrangement, each revolution of the cam 101 causes both the contact 45 to be opened and the pawl 100 to advance the ratchet 99 one step, the closing of the contact and the return movement of the pawl being effected by the spring 109. Furthermore, and as already hereinbefore mentioned, the arrangement is such that the contact 45 opens its circuit before the selector switch moves and closes after the selector switch has reached a new point. Consequently, no electrical circuit is broken at the selector switch points, and burning away of the contacts of the selector switch due to arcing is prevented.

It should be noted, in connection with Figure 2, that each smoke analyzer 4 is provided with suitable indicating reference characters corresponding to those shown on the indicating drum 104 of Figure 5; so that the origin of smoke or other suspended matter in a fluid stream conductor can be definitely and accurately determined both automatically and visually.

In view of the foregoing, it is believed that the manner of operation will be at once apparent without detailed explanation. However, it might be well to point out that when the electro-magnet 20 of a valve 3 is deenergized, the valve plunger, under the influence of a spring, moves to the right, closing the passage to the automatic detecting apparatus and opening the passage to the visual inspection means. When the electro-magnet is energized, the valve plunger moves to the left, closing the passage to the visual inspection means and opening the passage to the automatic detecting means. Each valve 3 is held open in turn for a few seconds, when it is permitted to release and the next valve operated. If, on the opening of any valve 3, smoke is present in the fluid stream, it passes through the automatic detecting apparatus causing the relay 79 to operate, which in turn operates the main smoke alarm gong 70 and the smoke lamp 96 and causes the timer arrangement to cease its operation and permit this particular valve to remain open. This valve will continue to remain open so long as smoke of sufficient density continues to pass through the automatic detecting apparatus or until the line re-check button 89 has been manually operated to release this valve to permit the regular operation of the other valves in turn, to determine if a second fluid stream conductor is carrying smoke.

If at any time the automatic detecting device becomes inoperable by failure of the main lamp 19 or its energizing circuit, or if at any time the signalling means becomes inoperative by failure of the main smoke gong 70 or its energizing circuit, trouble signals will be given, and upon removal of at least the audible trouble signal, all of the fluid streams being supervised will be returned to the visual inspection apparatus.

It will, of course, be understood that failure of any particular valve electro-magnet 20 or its energizing circuit will directly return the fluid stream controlled thereby to the visual inspection apparatus.

While no attempt has been made to show the relative location and size of the various constituent parts of the elements hereinabove described, it should nevertheless be understood that the various elements can be so arranged and constructed as to be received within the cabinet shown at 1 in Figure 1 of the drawings.

From the foregoing description it will be seen that I have produced an apparatus for detecting the presence of suspended matter in fluids which has great utility and which is practicable and highly efficient; and that I have at the same time accomplished the various objects of my invention. It will be understood, moreover, that my invention may be embodied in various equivalent forms of construction; and I accordingly do not wish it to be limited, save as defined in the appended claims.

I claim:

1. An installation for detecting the presence of suspended matter in fluids comprising a plurality of fluid stream conductors, means for maintaining a fluid flow through said conductors, means for permitting visual inspection of the fluid stream of each conductor, means responsive to the presence of opaque suspended matter in fluids for signalling the presence of suspended matter in the respective fluid streams, said responsive means including a source of light, means to divert the fluid streams successively from said fluid stream conductors to the responsive means before they become subjected to visual inspection, said last named means comprising a valve in each fluid stream conductor normally open with respect to the visual inspection means and closed with respect to the responsive means, a normally de-energized electro-magnet associated with each said valve, and means to energize said electro-magnets in succession to open each valve in succession with respect to the responsive means and to close it with respect to the visual inspection means, an audible trouble alarm, a visible trouble alarm, means to operate both trouble alarms upon failure of the source of light, and manually operable means to disconnect all of the fluid stream conductors from the responsive means more particularly following failure of the source of light and to return them to visual inspection while at the same time rendering the audible trouble alarm ineffective but indicating the inoperativeness of the responsive means by said visible trouble alarm, said last named means serving to render ineffective the means to energize the electro-magnets in succession, to break the normal circuits of the audible and visible trouble alarms, and to establish a new circuit for the visible trouble alarm for indicating the inoperativeness of the responsive means.

2. An installation for detecting the presence of suspended matter in fluids comprising a plurality of fluid stream conductors, means for maintaining a fluid flow through said conductors, means for permitting visual inspection of the fluid stream of each conductor, means responsive to the presence of opaque suspended matter in fluids for signaling the presence of suspended matter in the respective fluid streams, said responsive means including a source of light, means to divert the fluid streams successively from said fluid stream conductors to the responsive means before they become subjected to visual inspection, an audible trouble alarm, a visible trouble alarm, means to operate both trouble alarms upon failure of the source of light, and manually operable means to disconnect all of the fluid stream conductors from the responsive means more particularly following failure of the source of light and to return them to visual inspection while at the same time rendering the audible trouble alarm ineffective but indicating the inoperativeness of the responsive means by said visible trouble alarm, said last named means serving to render ineffective the means to divert the fluid streams successively from the fluid stream conductors to the responsive means, to break the normal circuits of the audible and visible trouble alarms, and to establish a new circuit for the visible trouble alarm for indicating the inoperativeness of the responsive means.

3. The combination with a plurality of fluid stream conductors, a device for detecting the presence of suspended matter in fluids, electro-magnetically operated valves in the conductors, common means connecting said electro-magnetically operated valves to the detecting device, a source of electrical potential, a selecting switch and electrical connections to actuate said electro-magnetically operated valves in a predetermined order to direct fluid from the conductors to the detecting device in such order, means to actuate the selecting switch, an alarm signal, means to actuate said alarm signal comprising a galvanometer relay actuated by the detecting device, a main alarm relay, a contact of said main alarm relay controlling said alarm signal, and means to control said main alarm relay by said galvanometer relay, and means to maintain the electro-magnetically operated valve in one certain fluid conductor in actuated condition upon actuation of the detecting device due to the presence of suspended matter in the said one certain fluid conductor to thereby maintain the detecting device actuated to maintain said alarm signal, comprising electro-magnetically operated means to render said switch actuating means inoperative, and a second contact of said main alarm relay controlling said last named means.

HARRY CAMPBELL GRANT, Jr.